(12) United States Patent
Hamamoto (10) Patent No.: US 6,528,738 B2
(45) Date of Patent: Mar. 4, 2003

(54) ELECTRONIC BALANCE/SCALE (75) Inventor: Hiroshi Hamamoto, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 140 days.

(21) Appl. No.: 09/791,583

(22) Filed: Feb. 26, 2001

(65) Prior Publication Data
US 2001/0017101 A1 Aug. 30, 2001

(30) Foreign Application Priority Data

Feb. 29, 2000 (JP) ........................................ 2000-053181

(51) Int. Cl.$^7$ .................. G01G 19/34; G01G 23/01; G01G 7/00
(52) U.S. Cl. ................... 177/25.13; 177/210 R; 702/101; 705/415
(58) Field of Search .................. 702/101, 102, 702/173; 705/414, 415, 416; 177/25.11, 25.12, 25.13, 25.14, 25.15, 177, 210 R (56) References Cited

U.S. PATENT DOCUMENTS

| 3,860,077 A | * | 1/1975 | Utzinger et al. ............ 177/165 |
|---|---|---|---|
| 4,447,885 A | * | 5/1984 | Biss ........................ 177/25.13 |
| 4,711,313 A | | 12/1987 | Iida et al. ................... 177/127 |
| 4,751,973 A | * | 6/1988 | Freeman et al. ........ 177/25.13 |
| 4,763,739 A | * | 8/1988 | Kasinoff ................. 177/210 R |
| 4,858,161 A | * | 8/1989 | Baumann ................ 177/25.13 |
| 4,890,246 A | | 12/1989 | Oldendorf et al. ....... 177/25.13 |
| 4,922,922 A | * | 5/1990 | Pollock et al. .......... 177/25.17 |
| 5,183,124 A | * | 2/1993 | Borchard .............. 177/210 FP |

FOREIGN PATENT DOCUMENTS

DE 3639521 A1 11/1986

OTHER PUBLICATIONS

European Search Report.

* cited by examiner

*Primary Examiner*—Randy W. Gibson
(74) *Attorney, Agent, or Firm*—Rader Fishman & Grauer (57) ABSTRACT

After power supply, a CPU, serving as warm-up duration calculation clock, calculates duration for warm-up operation from temperature characteristic data of a load detection part on the basis of a power shut down duration, for notifying it's warm-up operation state by a display device on the basis of the calculated duration for warm-up operation.

9 Claims, 7 Drawing Sheets

ELECTRONIC BALANCE/SCALE

BACKGROUND OF THE INVENTION

1. Field of the Invention

The present invention relates to an electronic balance/scale (including both an electronic balance and an electronic scale) requiring warm-up operation for a prescribed duration before usage.

2. Description of the Prior Art

An electronic balance/scale performs warm-up operation for a prescribed duration before attaining a thermally stable state, in order to eliminate a thermal error of a load detection part resulting from temperature rise after power supply.

However, a conventional electronic balance/scale has no function of notifying that it is in warm-up operation to the user and the user must manage the duration from the start of power supply. Therefore, the electronic balance/scale may start measurement without performing sufficient warm-up operation, i.e., before the load detection part reaches a thermally stable state, to result in an incorrect measurement result due to influence by temperature drift. Or, the electronic balance/scale may excessively perform warm-up operation, to result in inferior working efficiency up to completion of measurement.

SUMMARY OF THE INVENTION

In consideration of the aforementioned circumstances, an object of the present invention is to provide an electronic balance/scale capable of performing measurement after proper warm-up operation.

The present invention provides an electronic balance/scale comprising a memory device storing data or a function related to the temperature characteristic of a load detection part, warm-up duration calculation means reading the data or the function stored in the memory device at the time of power supply for calculating a warm-up duration necessary for the load detection part to reach a thermally stable state in response to the state of the load detection part at the time of power supply on the basis of the data or the function, and notifying means notifying whether it is in warm-up operation or not on the basis of the warm-up duration calculated by the warm-up duration calculation means.

According to a first aspect of the present invention, the state of the load detection part employed by the warm-up duration calculation means for calculating the warm-up duration is a power shut down duration when power has been shut down. In order to calculate the power shut down duration, it comprises a clock device generating a signal indicating a time, a power shut down time storage processing means storing a power shut down time in the memory device on the basis of the signal from the clock device at the time of power shut down, and power shut down duration calculation means calculating the power shut down duration from the signal from the clock device and the power shut down time stored in the memory device at the time of power supply.

In this aspect, an example of the data or the function stored in the memory device is data indicating the relation between the power shut down duration and the warm-up duration, and the warm-up duration calculation means calculates the warm-up duration from the power shut down duration on the basis of the data.

Again, in this aspect, another example of the data or function stored in the memory device is the first data indicating the relation between the power shut down duration and the temperature of the load detection part and the second data indicating the relation between the temperature of the load detection part and the warm-up duration, and the warm-up duration calculation means calculates the temperature of the load detection part from the first data on the basis of the power shut down duration for calculating the warm-up duration from the second data on the basis of the calculated temperature.

Furthermore, in this aspect, still another example of the data or function stored in the memory device is a function deriving the warm-up duration while employing the power shut down duration as a variable, and the warm-up duration calculation means calculates the warm-up duration from the power shut down duration by an operation with the function.

According to a second aspect of the present invention, the state of the load detection part employed by the warm-up duration calculation means for calculating the warm-up duration is the temperature of the load detection part at the time of power supply, and it comprises a temperature sensor for detecting the temperature.

In the second aspect, the data or function stored in the memory device is data indicating the relation between the temperature of the load detection part at the time of power supply and the warm-up duration, and the warm-up duration calculation means calculates the warm-up duration from the temperature of the load detection part at the time of power supply on the basis of the data.

According to the present invention, the warm-up duration calculation means preferably sets the maximum necessary warm-up duration when energization comes first.

The notifying means can also serve as a display device for displaying a detection value of the load detection part. Alternatively, a device generating voice, a buzzer, or a notifying (warning) function of a CPU can be utilized as the notifying means.

Thus, the electronic balance/scale according to the present invention can measure weight after proper warm-up operation, thereby eliminating a measurement error resulting from temperature drift caused by a heat transfer characteristic specific to each of mechanical parts and electronic parts forming the electronic balance/scale.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
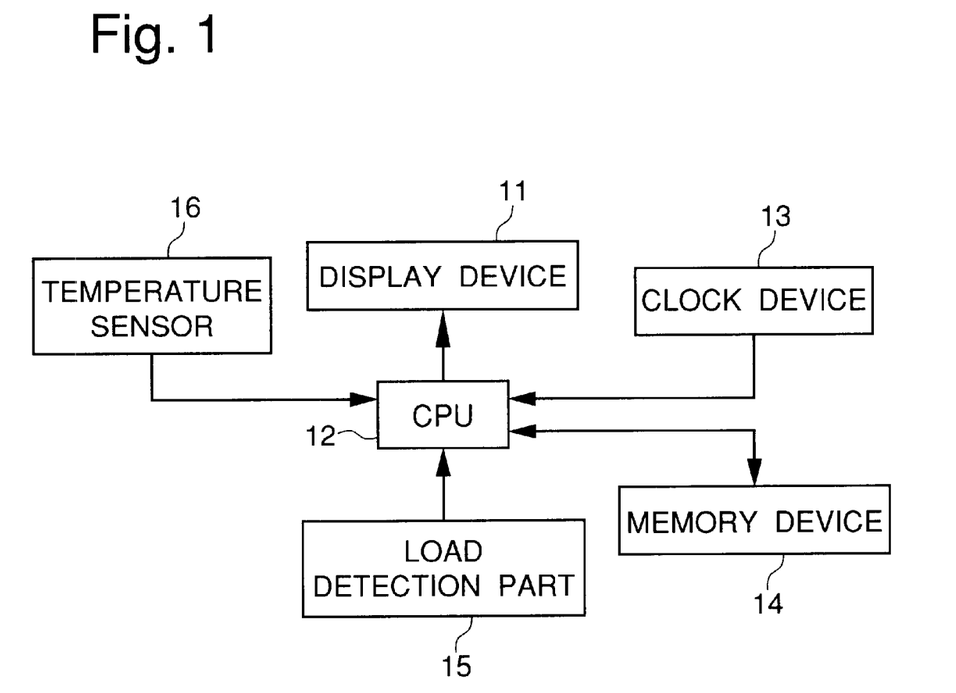
FIG. 1 is a block diagram schematically showing one embodiment of electronic balance/scale according to the present invention.
Figure 2:
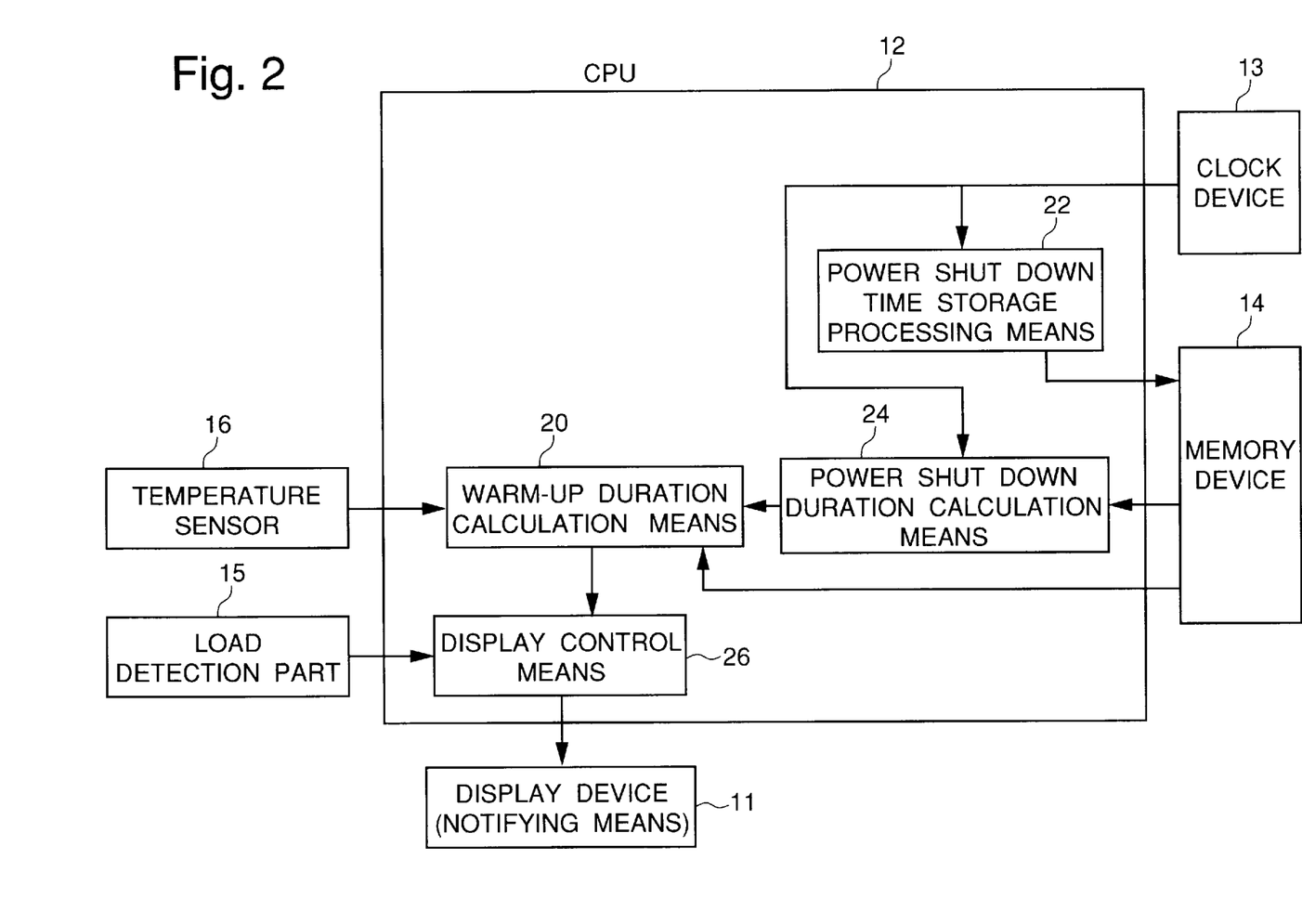
FIG. 2 is a block diagram concretely showing functions of a CPU shown in FIG. 1.

An electronic balance/scale according to one embodiment of the present invention is described with reference to FIGS. 1 and 2. FIG. 1 is a block diagram schematically showing the structure of the electronic balance/scale according to embodiment of the present invention. FIG. 2 is a block diagram concretely showing functions of a CPU (central processing unit) 12 shown in FIG. 1.

In general, the electronic balance/scale converts measured data detected in a load detection part 15 into a weight value in the CPU 12, and displays the same on a display device 11.

Mechanical parts and electronic parts forming the load detection part 15 have specific heat transfer characteristics respectively, and cause measurement errors resulting from temperature drift due to temperature change following heat generation after power supply until the same are stabilized at an equilibrium temperature. In order to eliminate the measurement errors, therefore, it requires warm-up operation until the load detection part 15 reaches the equilibrium temperature.

In an embodiment of the first aspect of the present invention, warm-up duration calculation means 20 implemented by the CPU 12 calculates warm-up duration on the basis of a power shut down duration. In order to calculate the power shut down duration, a clock device 13 generating a signal indicating a time and a memory device 14 are provided. The CPU 12 also implements power shut down time storage processing means 22 storing a power shut down time in the memory device 14 on the basis of the signal from the clock device 13 at the time of power shut down, along with power shut down duration calculation means 24 calculating the power shut down duration from the signal from the clock device 13 and the power shut down time stored in the memory device 14 at the time of power supply. On the basis of output from the warm-up duration calculation means 20, display control means 26, which is also implemented by the CPU 12, makes the display device 11 display the remaining warm-up duration when in warm-up operation, while controlling the display device 11 to be capable of displaying a detection signal of the load detection part 15 when the necessary warm-up duration elapses.

When power is supplied to this electronic balance/scale, it records time data from the clock device 13 in the memory device 14 at regular intervals through the CPU 12. Time storage is performed at any time until power is shut down. Updating of time information is interrupted when power is shut down, and time data lastly stored in the memory device 14 becomes the power shut down time.

Furthermore, the memory device 14 stores temperature characteristic data such as the heat transfer characteristic of the load detection part 15.

At the time of resupplying power, the CPU 12 reads time data from the clock device 13. At this time, it reads the power shut down time and the temperature characteristic data of the load detection part 15 from the memory device 14. The CPU 12 converts the duration when power for this electronic balance/scale has been shut down from the current power supply time and the power shut down time in previous usage, and obtains a warm-up duration necessary for attaining a thermally stable state from the temperature characteristic data of the load detection part 15. The CPU 12 displays the obtained necessary warm-up duration or the elapsed duration of warm-up operation on the display device 11, and the user determines whether measurement is possible or not on the basis of the display contents of the display device 11. When the necessary warm-up duration elapses, the CPU 12 displays the fact that measurement has been enabled on the display device 11.

When the electronic balance/scale is first energized, there is no previous power shut down time information and hence it displays the maximum necessary warm-up duration and performs warm-up operation on the basis of this duration.

Figure 3:
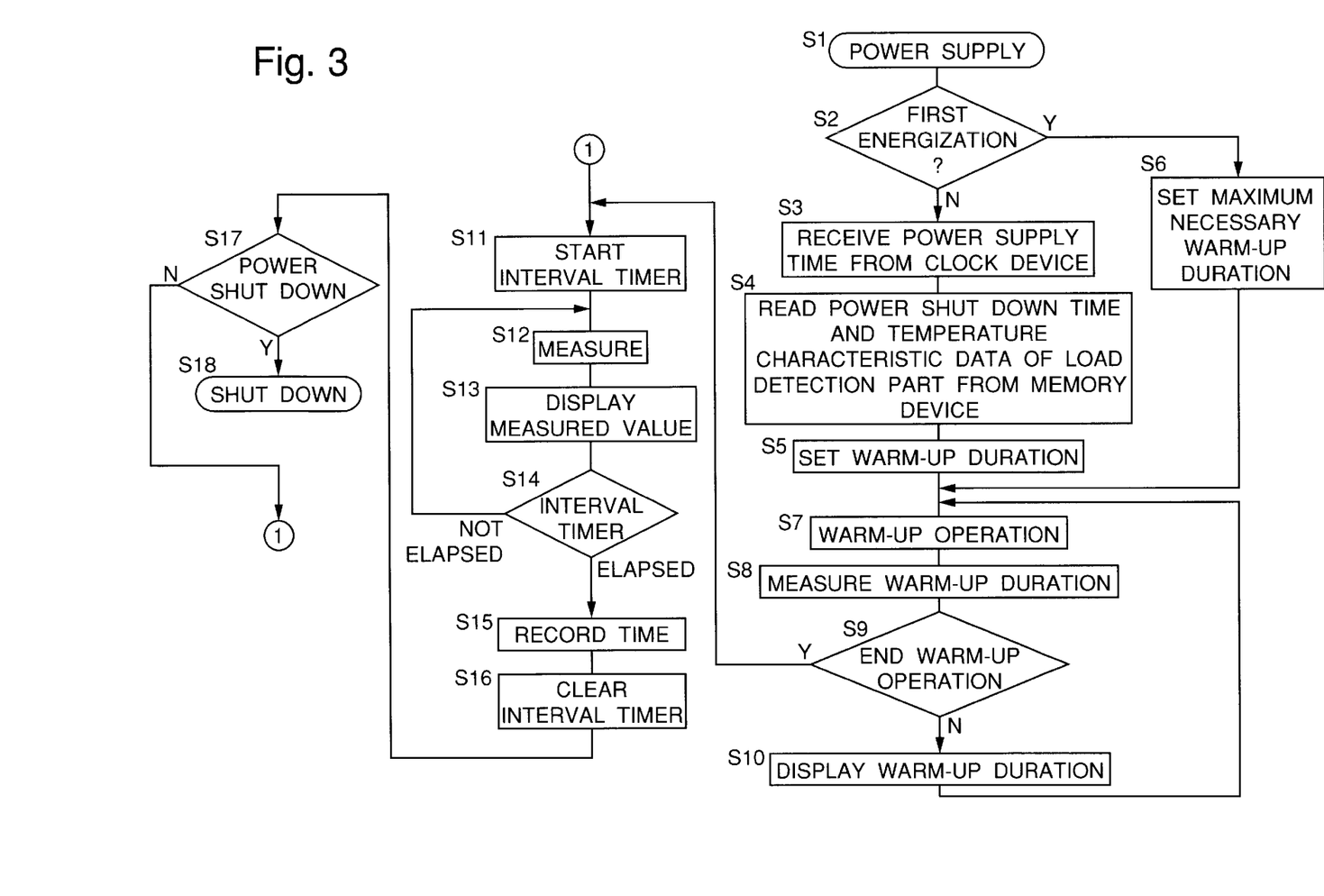
FIG. 3 is a flow chart showing operation of one embodiment of the present invention.

FIG. 3 is a flow chart showing a series of processing as to one embodiment of the first aspect of the present invention. When power is supplied, it reads time data from the clock device 13 also during warm-up operation, and displays the elapsed duration or the duration necessary for warm-up operation on the display device 11. After termination of the warm-up operation, it makes a weight display and posts that measurement has been enabled.

In more concrete terms, it first supplies power for energization (S1). It sets the warm-up duration at the maximum when energized first (S6), otherwise making processing through steps S3 to S5 (S2). In the steps S3 to S5, the CPU 12 reads the power supply time from the clock device 13 and reads the power shut down time in previous usage and temperature characteristic data of the load detection part 15 from the memory device 14, for calculating and setting the duration necessary for warm-up operation.

After setting the warm-up duration, it measures duration during warm-up operation, and performs warm-up operation while displaying information of the duration (S7 to S10). When the warm-up duration elapses, measurement of weight is enabled (S9) and an interval timer starts (S11).

When an object of measurement is placed on a prescribed portion of the load detection part 15, the CPU 12 performs measurement (S12) and display (S13) of the measured value, and after a lapse of an interval duration (S14), it stores the measured value and the time in the memory device 14 (S15), and clears the interval timer (S16). It goes to the step S11 when measurement is continually performed (S17), while it shuts down power when usage is cancelled (S18). The CPU 12 must read the time from the clock device 13 at regular time intervals, in order to store the power shut down time in the memory device 14. The interval timer is a counter for measuring the intervals for reading the time.

While the duration necessary for warm-up operation is small when a down duration between an end time of previous usage and power resupply time is short, it calculates the necessary warm-up duration on the basis of the duration between the end time of previous usage and the power resupply time in this embodiment, whereby measurement can be efficiently performed.

Figure 4A:
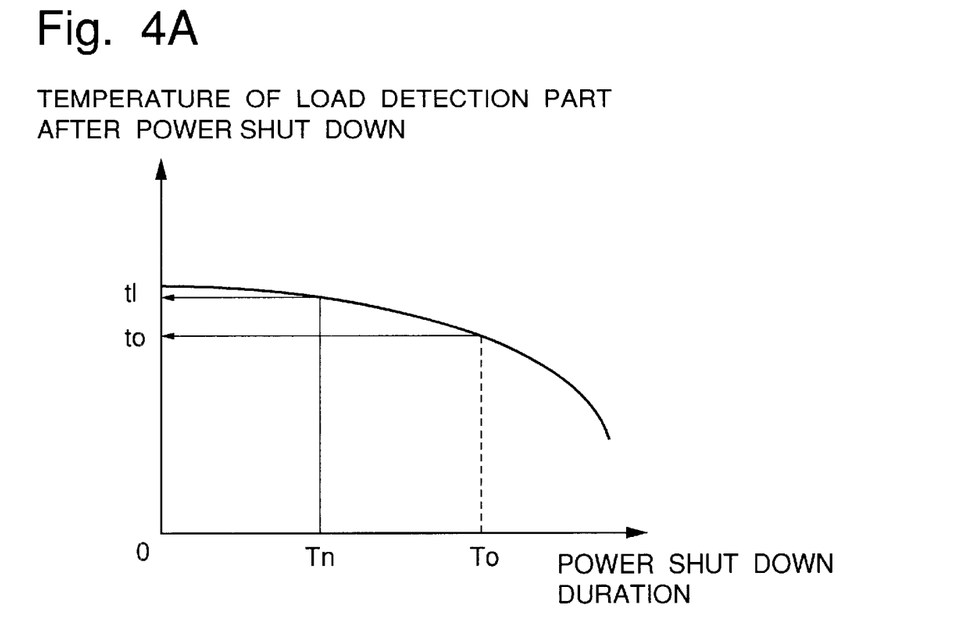
FIG. 4A illustrates the relation between a power shut down duration and the temperature of a load detection part after power shut down.
Figure 4B:
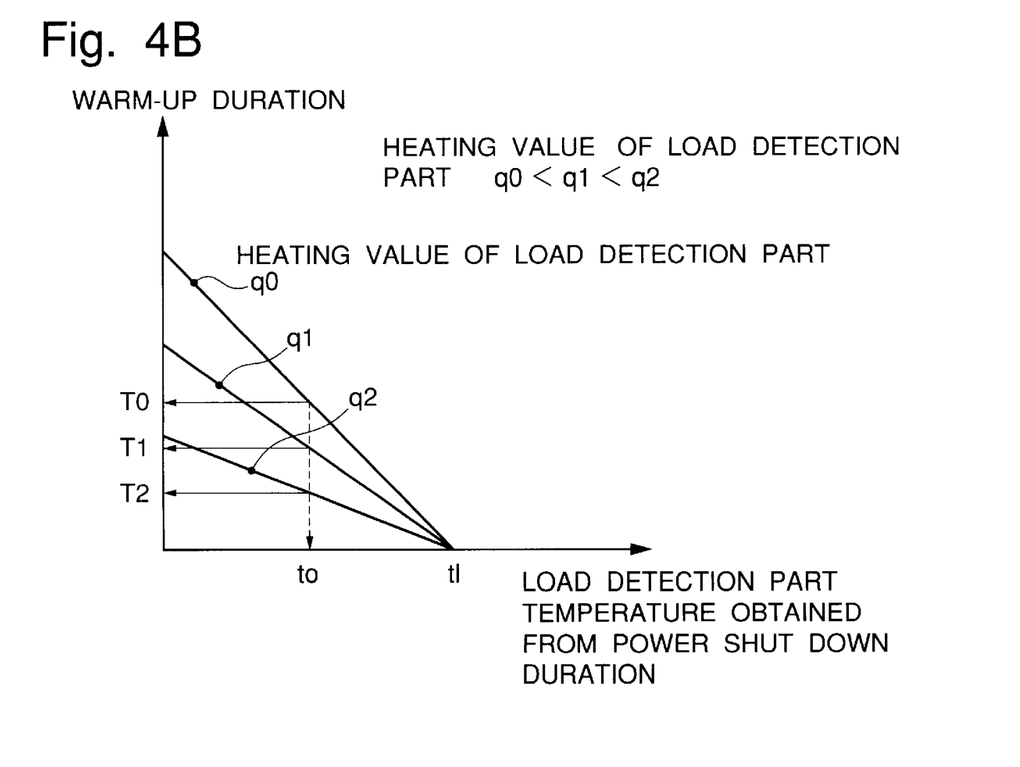
FIG. 4B illustrates the relation between the temperature of the load detection part and a necessary warm-up duration.

In order to implement the function of the first aspect, the memory device 14 stores data of the temperature characteristic of the load detection part 15 shown in FIG. 4A and data of the necessary warm-up duration shown in FIG. 4B, for example. The load detection part 15 generates heat during operation at a constant heating value, converges to a certain temperature with the operation duration, and enters an equilibrium state at the temperature so that the measured value is stabilized. The temperature characteristic diagram of FIG. 4A shows such a state that the temperature of the load detection part 15 which has been at the equilibrium temperature during operation lowers with duration due to power shut down. A duration Tn on the horizontal power shut down duration axis indicates a duration when it can be regarded that there is no temperature reduction of the load detection part 15, and symbol t1 denotes the current load detection part temperature. As to data of this temperature characteristic, an approximate expression is obtained in temperature adjustment and stored in the memory device 14.

The load detection part 15 has a specific heating value. FIG. 4B shows that the warm-up duration varies with the heating value. The heating value of the load detection part 15 can be grasped by an experiment, and is stored in the memory device 14. As the warm-up duration gets shorter and the temperature of the load detection part 15 at restart of operation gets higher, the duration to reach an equilibrium temperature, i.e., the necessary warm-up duration may be short. FIG. 4B shows a warm-up duration necessary for reaching the equilibrium temperature from restarting operation, and an approximate expression indicating this relation is also obtained in adjustment and stored in the memory device 14.

Operation of obtaining the warm-up duration with the data shown in FIGS. 4A and 4B is performed as follows: When starting or restarting operation, the CPU 12 reads the approximate expression shown in FIG. 4A and the heating value of the load detection part 15 as the temperature characteristic data from the memory device 14. Then, it reads the power shut down time of the previous operation and the power supply time, and obtains a power shut down duration. Thus, the power shut down duration To is obtained, and the load detection part temperature t0 is obtained from FIG. 4A. It reads the data shown in FIG. 4B from the memory device 14, and obtains the warm-up duration from the obtained load detection part temperature t0.

When the load detection part temperature t0 obtained from the power shut down duration is lower than the temperature t1, it obtains the warm-up duration in the aforementioned manner. When the load detection part temperature t0 is higher than the temperature t1, it regards that warm-up operation is unnecessary.

While the memory device 14 stores the data indicating the temperature characteristic of the load detection part 15 or the approximate expression in the aforementioned embodiment, it may alternatively store a function deriving the warm-up duration while employing the power shut down duration as a variable. In this case, the CPU 12 can calculate the warm-up duration from the power shut down duration by an operation with the function.

Figure 5A:
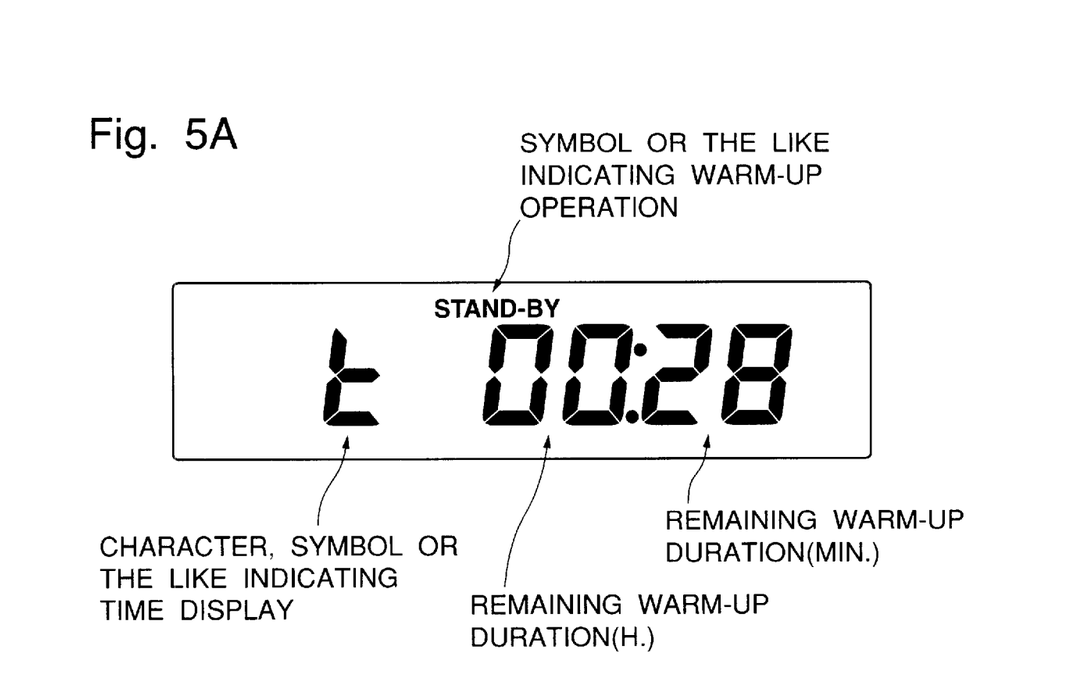
FIG. 5A illustrates an exemplary display screen of a display device indicating warm-up operation.
Figure 5B:
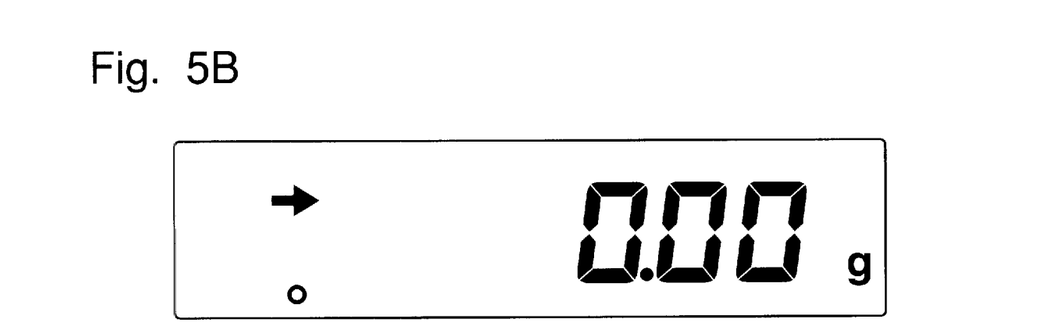
FIG. 5B illustrates another exemplary display screen indicating weight.

FIGS. 5A and 5B illustrate exemplary display screens of the display device 11. During warm-up operation, as shown in FIG. 5A, time is displayed indicating the remaining warm-up duration along with a symbol "t" indicating warm-up operation, and a display such as "STAND-BY", for example, capable of clearly identifying that it is not a weight display. The displays of the symbol and characters are of course mere examples.

When the displayed warm-up duration reaches zero, the CPU 12 makes a weight display shown in FIG. 5B on the display device 11, and notifies that measurement is enabled. As an example of exemplary weight display, unlike the warm-up duration display, the display of "STAND-BY" turn off and the symbol and characters indicating the warm-up duration also turn off. Then the weight unit is displayed. Obviously, the screen of the weight display is also a mere example.

In an embodiment of the second aspect of the present invention, the warm-up duration calculation means 20 shown in FIG. 2 calculates the warm-up duration from data indicating the relation between the temperature of the load detection part 15 at the time of power supply and the warm-up duration stored in the memory device 14 on the basis of the temperature of the load detection part 15 at the time of power supply. It comprises a temperature sensor 16 on the load detection part 15, in order to detect the temperature of the load detection part 15. The temperature sensor 16 regularly monitors the temperature of the load detection part 15.

Figure 6:
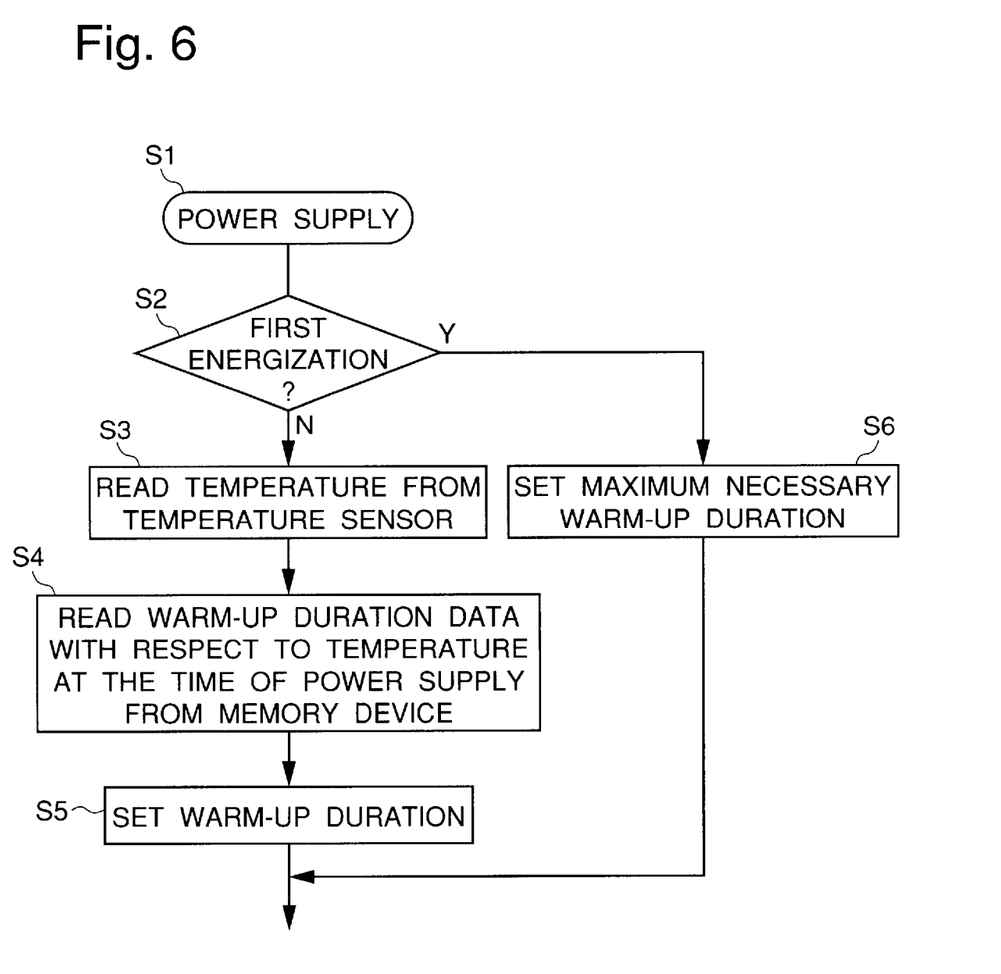
FIG. 6 is a flow chart showing operation of another embodiment of the present invention.

FIG. 6 shows operation of this embodiment of the second aspect. It corresponds to steps S1 to S6 in the flow chart of FIG. 3. Operation following step S7 is identical to that shown in FIG. 3, and is hence omitted.

When supplying power, it sets the maximum necessary warm-up duration if it is for the first time of energization, while it detects the temperature with the temperature sensor 16 (S3) and reads data indicating the relation between the temperature of the load detection part 15 at the time of power supply and the warm-up duration from the memory device 14 (S4) if restarting operation. It obtains the warm-up duration from the data on the basis of the detected temperature (S5).

Figure 7:
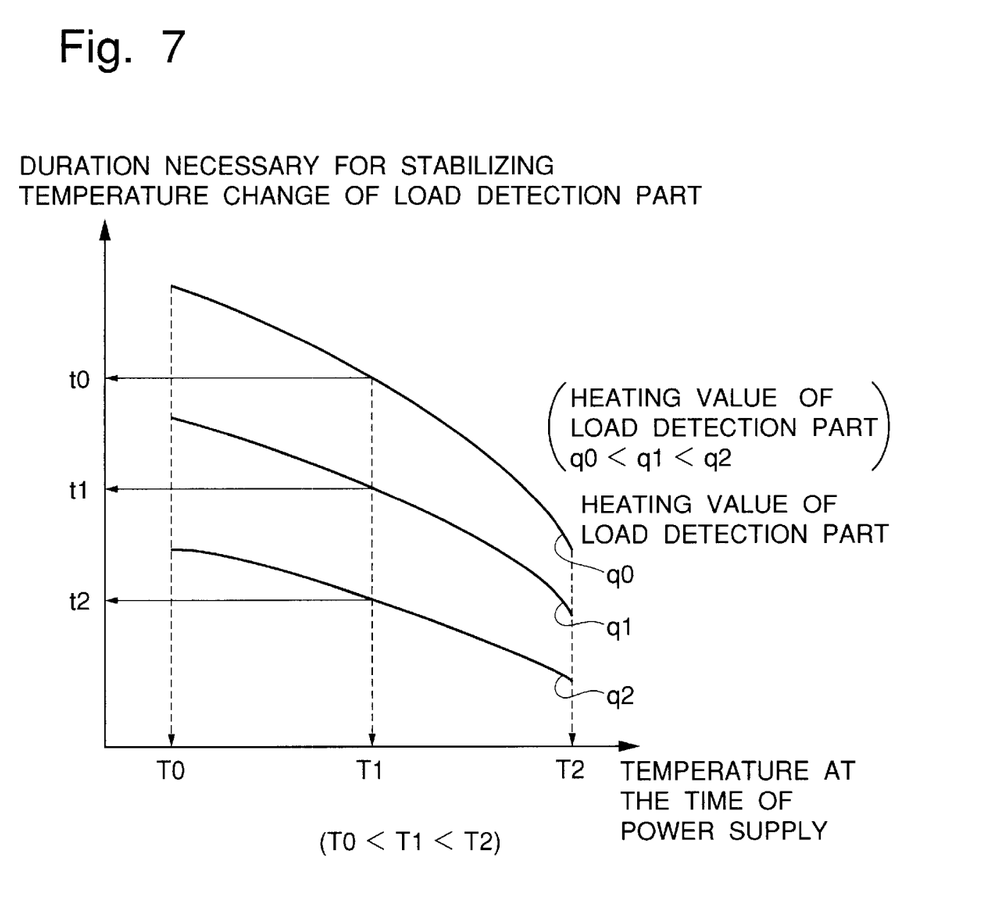
FIG. 7 illustrates the relation between the temperature of the load detection part at the time of power supply and necessary warm-up duration as another example of temperature characteristic data of the load detection part.

FIG. 7 shows data, stored in the memory device 14 for implementing this embodiment of the second aspect, indicating the relation between the temperature of the load detection part 15 at the time of power supply and the necessary warm-up duration. Also approximate expressions are obtained in temperature adjustment from such curves which are temperature characteristics, and stored in the memory device 14. The temperature sensor 16 provided on the load detection part 15 measures the temperature at the time of power supply. The heating value of the load detection part 15 can be grasped in an experimental stage of product development, and hence the same is also stored in the memory device 14.

Operation of steps S3 and S4 in FIG. 6 is concretely performed as follows: At the time of power supply, the CPU 12 first reads the approximate expressions of the curves of FIG. 7 and the heating value of the load detection part 15 from the memory device 14 as temperature characteristic data. Then, it measures the temperature (temperature at the time of power supply) of the load detection part 15. It obtains the warm-up duration from the temperature.

In an electronic balance/scale, the temperature sensor 16 is necessarily provided on the load detection part 15, in order to correct sensitivity against change of a surrounding temperature. In this embodiment, the warm-up duration can be obtained through the temperature sensor 16.

While it notifies that measurement has been enabled by making a weight display on the display device 11 as notifying means in this embodiment, it is not restricted to this if displaying that measurement has been enabled. In place of that by a display, it may notify whether it is in warm-up operation or the warm-up operation has been completed with a voice or buzzer.

Although the present invention has been described and illustrated in detail, it is clearly understood that the same is by way of illustration and example only and is not to be taken by way of limitation as the spirit and scope of the present invention are limited only by the terms of the appended claims.

What is claimed is:

1. An electronic balance/scale comprising:
   a memory device storing data or a function related to a temperature characteristic of a load detection part;

warm-up duration calculation means reading the data or the function stored in the memory device at the time of power supply for calculating a warm-up duration necessary for the load detection part to reach a thermally stable state in response to the state of the load detection part at the time of power supply on the basis of the data or the function; and notifying means notifying whether or not it is in warm-up operation on the basis of the warm-up duration calculated by the warm-up duration calculation means.

2. The electronic balance/scale according to claim 1, wherein the state of the load detection part employed by the warm-up duration calculation means for calculating the warm-up duration is a power shut down duration when power has been shut down, the electronic balance/scale further comprising for calculating the power shut down duration:

a clock device generating a signal indicating a time, power shut down time storage processing means storing a power shut down time in the memory device on the basis of the signal from the clock device at the time of power shut down, and power shut down duration calculation means calculating the power shut down duration from the signal of the clock device and the power shut down time stored in the memory device at the time of power supply.

3. The electronic balance/scale according to claim 2, wherein the data or function stored in the memory device is data indicating the relation between the power shut down duration and the warm-up duration, and the warm-up duration calculation means calculates the warm-up duration from the power shut down duration on the basis of the data.

4. The electronic balance/scale according to claim 2, wherein the data or function stored in the memory device is first data indicating the relation between the power shut down duration and the temperature of the load detection part and second data indicating the relation between the temperature of the load detection part and the warm-up duration, and the warm-up duration calculation means calculates the temperature of the load detection part from the first data on the basis of the power shut down duration for calculating the warm-up duration from the second data on the basis of the calculated temperature.

5. The electronic balance/scale according to claim 2, wherein the data or function stored in the memory device is a function deriving the warm-up duration while employing the power shut down duration as a variable, and the warm-up duration calculation means calculates the warm-up duration from the power shut down duration through operation with the function.

6. The electronic balance/scale according to claim 1, wherein the state of the load detection part employed by the warm-up duration calculation means for calculating the warm-up duration is the temperature of the load detection part at the time of power supply, the electronic balance/scale further comprising a temperature sensor for detecting the temperature.

7. The electronic balance/scale according to claim 6, wherein the data or the function stored in the memory device is data related to a temperature characteristic indicating the relation between the temperature of the load detection part at the time of power supply and the warm-up duration, and the warm-up duration calculation means calculates the warm-up duration from the temperature of the load detection part at the time of power supply on the basis of the data.

8. The electronic balance/scale according to claim 1, wherein the warm-up duration calculation means sets the maximum necessary warm-up duration when energization comes first.

9. The electronic balance/scale according to claim 1, wherein the notifying means is a display device for displaying a detection value of the load detection part.

* * * * *